United States Patent
Nakagawa (10) Patent No.: US 12,214,765 B2
(45) Date of Patent: Feb. 4, 2025

(54) SUPPORT STRUCTURE FOR BRAKE LEVER, AND OFF-ROAD VEHICLE

(71) Applicant: Kawasaki Motors, Ltd., Hyogo (JP)

(72) Inventor: Naoto Nakagawa, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/075,416

(22) Filed: Dec. 6, 2022

(65) Prior Publication Data

US 2024/0182004 A1    Jun. 6, 2024

(51) Int. Cl.
   *B60T 7/10*     (2006.01)
   *B60K 35/10*    (2024.01)
   *B62D 63/04*    (2006.01)

(52) U.S. Cl.
   CPC .............. *B60T 7/101* (2013.01); *B60K 35/10* (2024.01); *B60K 2700/00* (2013.01); *B62D 63/04* (2013.01)

(58) Field of Classification Search
   CPC .......................... B60T 7/101; B60K 2700/00
   See application file for complete search history.

(56) References Cited

U.S. PATENT DOCUMENTS

| | | | |
|---|---|---|---|
| 11,285,914 B2 * | 3/2022 | Alu ........................ | B60T 7/104 |
| 2006/0060023 A1 * | 3/2006 | Yamanaka .............. | B60T 7/101 74/503 |
| 2008/0110709 A1 | 5/2008 | Vidal Ferrer et al. | |

FOREIGN PATENT DOCUMENTS

FR              2753670 A1 *    3/1998    .............. B60T 7/101

* cited by examiner

*Primary Examiner* — Vicky A Johnson
(74) *Attorney, Agent, or Firm* — XSENSUS LLP (57) ABSTRACT

A brake lever support structure includes: a brake lever movable between a working position at which a parking brake of an off-road vehicle works and a cancel position at which the parking brake is cancelled; and an interior panel defining an inner surface of a cabin of the off-road vehicle. The brake lever extends from inside of the cabin to outside of the cabin through the interior panel. The interior panel includes a stopper that contacts the brake lever at the cancel position to restrict movement of the brake lever.

15 Claims, 8 Drawing Sheets

SUPPORT STRUCTURE FOR BRAKE LEVER, AND OFF-ROAD VEHICLE

FIELD

The technique disclosed here relates to a support structure for a brake lever and an off-road vehicle.

BACKGROUND

Patent Document 1 (U.S. Patent Application Publication No. 2008/0110709) discloses a brake lever of a parking brake of a vehicle. A driver operates a brake lever to thereby switch the parking brake between a working state and a cancel state.

SUMMARY

When an off-road vehicle travels off-road, the vehicle body shakes greatly in some cases. In such cases, with the shake of the vehicle body, the brake lever might vibrate. If the brake lever unnecessarily vibrates in this way, passengers might feel uncomfortable.

It is therefore an object of the technique disclosed here to reduce vibrations of a brake lever.

A brake lever support structure disclosed here includes: a brake lever movable between a working position at which a parking brake of an off-road vehicle works and a cancel position at which the parking brake is cancelled; and an interior panel defining an inner surface of a cabin of the off-road vehicle, wherein the brake lever extends from inside of the cabin to outside of the cabin through the interior panel, and the interior panel includes a stopper that contacts the brake lever at the cancel position to restrict movement of the brake lever.

An off-road vehicle disclosed here includes: a vehicle body including a cabin; a wheel disposed to the vehicle body; a parking brake that applies a braking force to the wheel; and the brake lever support structure.

The brake lever support structure can reduce vibrations of the brake lever.

The off-road vehicle can reduce vibrations of the brake lever.

DESCRIPTION OF EMBODIMENTS

Figure 1:
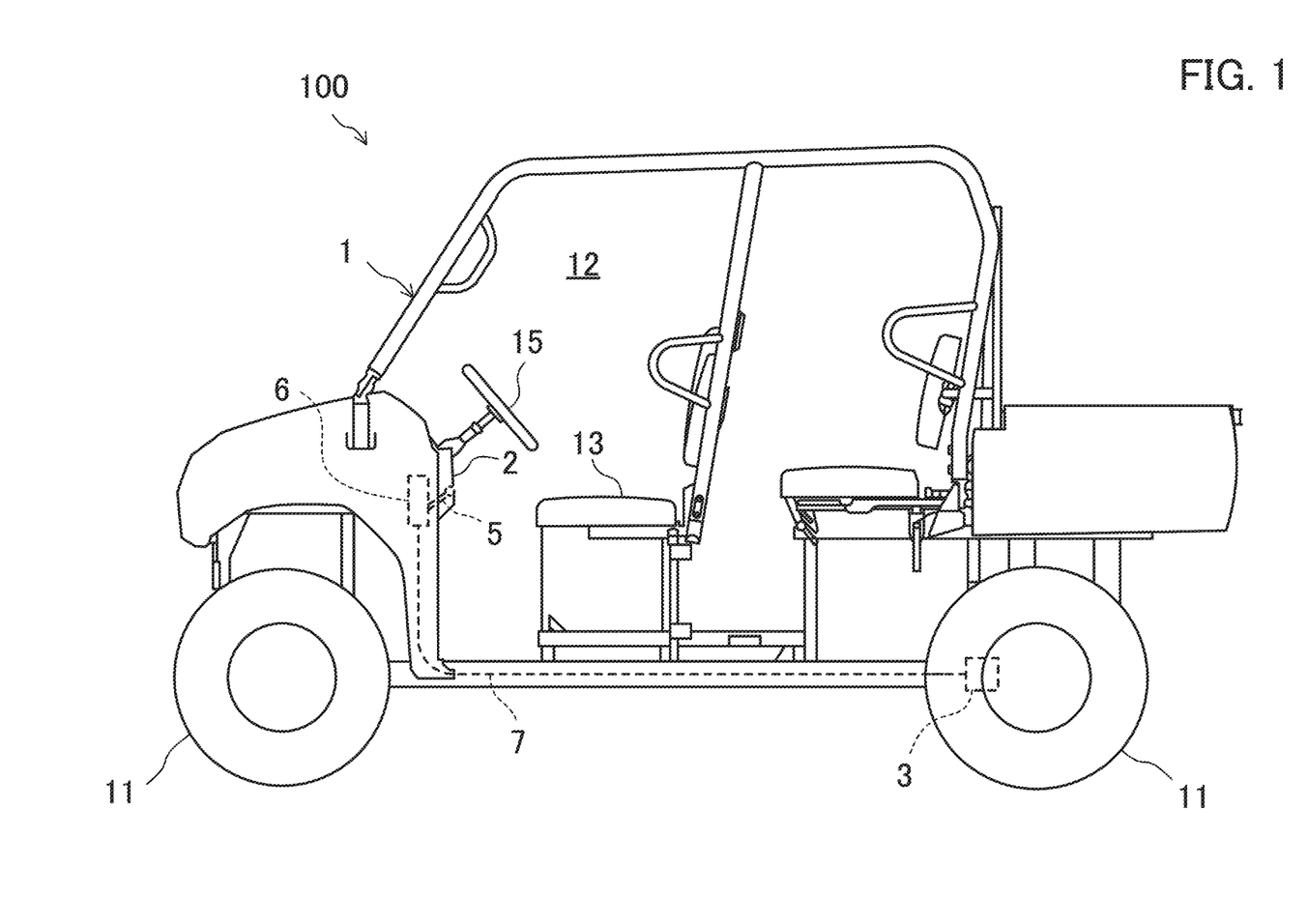
FIG. 1 is a side view of a utility vehicle.

An exemplary embodiment will be described in detail hereinafter with reference to the drawings. FIG. 1 is a side view of a utility vehicle 100. The utility vehicle 100 can travel off-road. That is, the utility vehicle 100 is an example of an off-road vehicle. Forward of the utility vehicle 100, that is, forward of a vehicle, will be hereinafter referred to as "forward." Left-right directions are defined based on a state where the vehicle is oriented forward.

The utility vehicle 100 includes: a vehicle body 1 including a cabin 12; and a wheel 11 disposed to the vehicle body 1. The utility vehicle 100 includes wheels 11. The wheels 11 include left and right front wheels 11 and left and right rear wheels 11. The vehicle body 1 includes a dashboard 2 defining a front portion of the cabin 12. The dashboard 2 is an example of an interior panel defining the inner surface of the cabin 12. In the cabin 12, a driver's seat 13 and a steering wheel 15 are disposed.

The utility vehicle 100 also includes a parking brake 3 that applies a braking force to the wheels 11, and a brake lever 5 that allows the parking brake 3 to work. In this example, the parking brake 3 is disposed to the left and right rear wheels 11. The utility vehicle 100 may also include a linkage mechanism 6 and a brake wire 7 that transmit operation of the brake lever 5 to the parking brake 3.

The parking brake 3 is of a drum type or a disc type, for example. The parking brake 3 can switch between a working state where a braking force is applied to the wheels 11 and a cancel state where no braking force is applied to the wheels 11.

Figure 2:
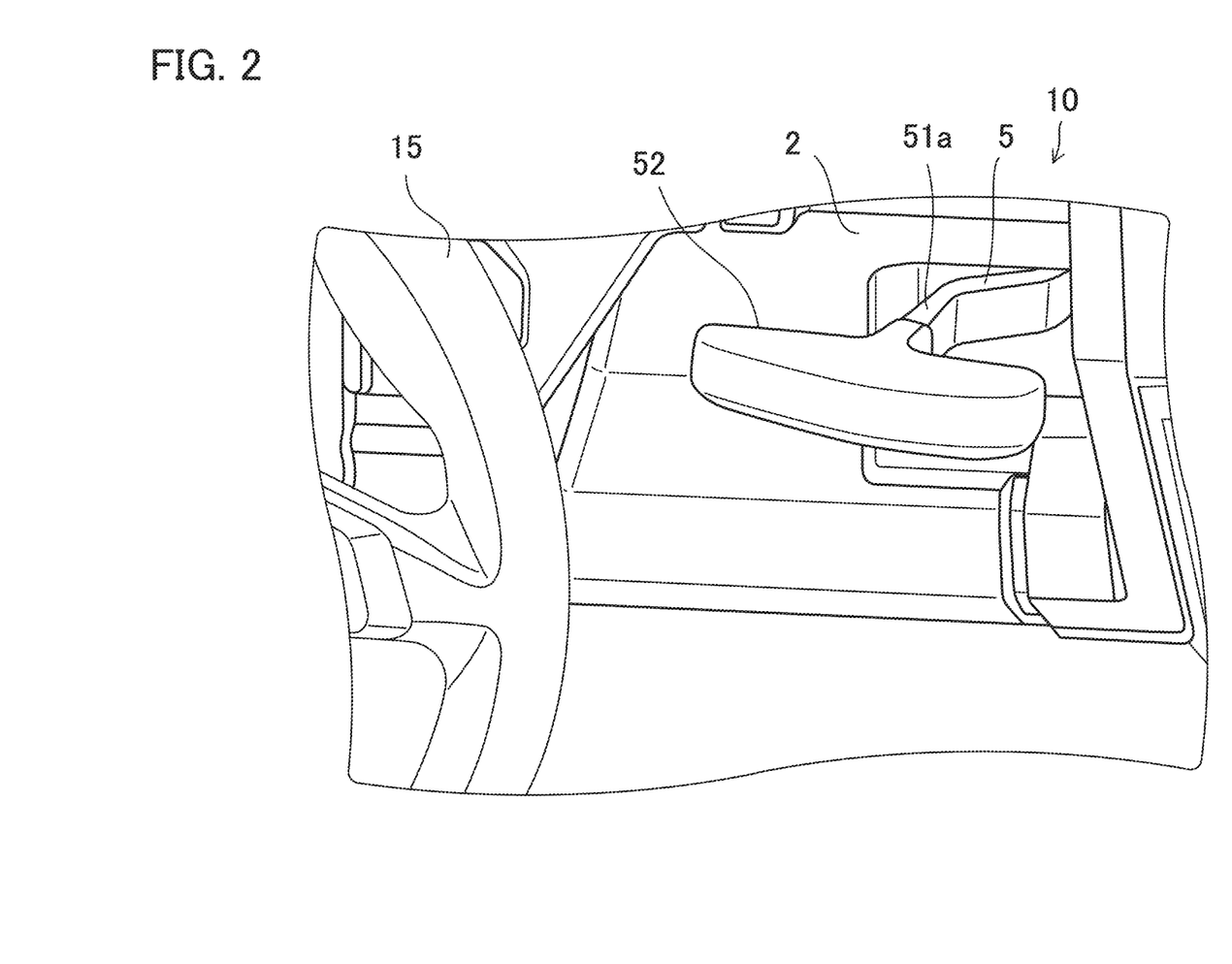
FIG. 2 is a perspective view of a dashboard and a brake lever.
Figure 3:
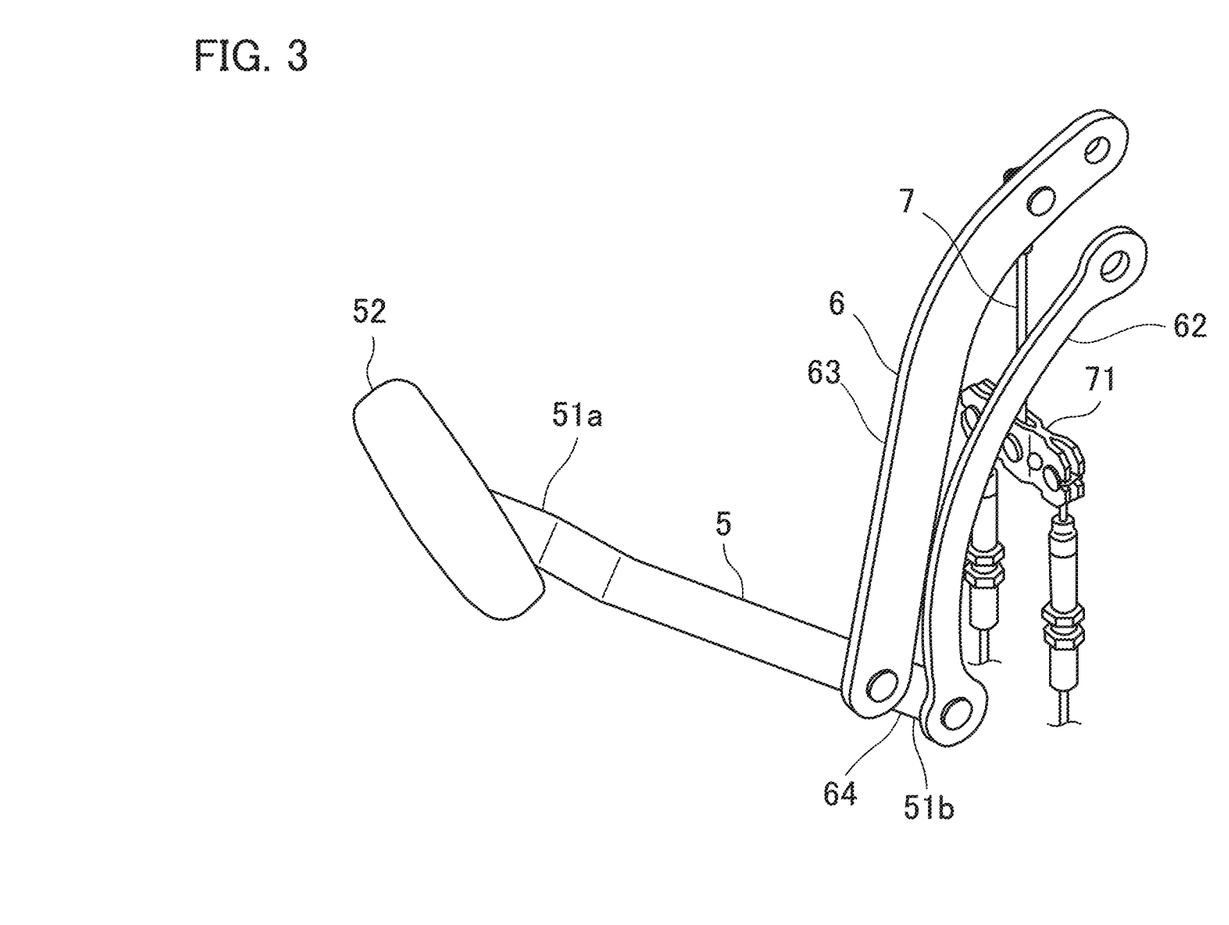
FIG. 3 is a perspective view of a linkage mechanism and a brake wire.

FIG. 2 is a perspective view of the dashboard 2 and the brake lever 5. FIG. 3 is a perspective view illustrating the brake lever 5, the linkage mechanism 6, and the brake wire 7. The brake lever 5 is disposed near the driver's seat 13. In this example, the brake lever 5 is disposed forward of the driver's seat 13 and rightward of the steering wheel 15. The brake lever 5 extends from the inside of the cabin 12 to the outside of the cabin 12 through the dashboard 2. Specifically, although the brake lever 5 has a curved portion to some degree, the brake lever 5 is substantially perpendicular to the left-right directions and oblique to the front-rear directions and the top-bottom directions. The directions along which the brake lever 5 generally extends will be hereinafter referred to as length directions of the brake lever 5. The brake lever 5 is made of, for example, a metal. The brake lever 5 has a plate shape. The brake lever 5 includes a first end portion 51a at one end in the length direction, and a second end portion 51b at the other end in the length direction. In this example, the first end portion 51a is a rear end portion of the brake lever 5. The second end portion 51b is a front end portion of the brake lever 5. The first end portion 51a is located inside the cabin 12. A grip 52 to be held by a driver is disposed at the first end portion 51a. The second end portion 51b is located outside the cabin 12.

Figure 4:
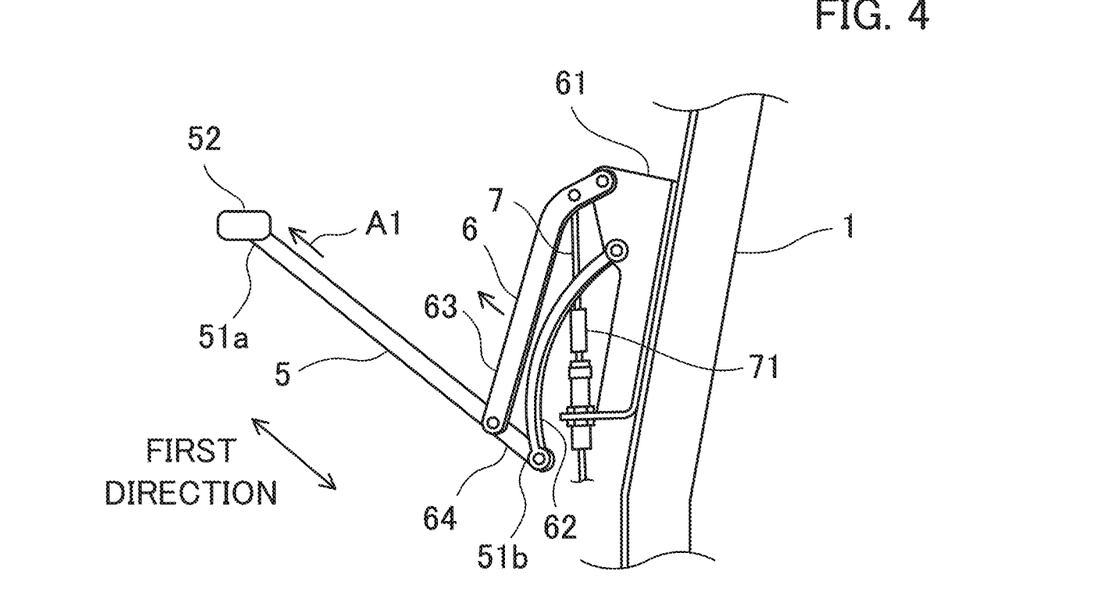
FIG. 4 is a side view of the linkage mechanism while the brake lever is at a cancel position.
Figure 5:
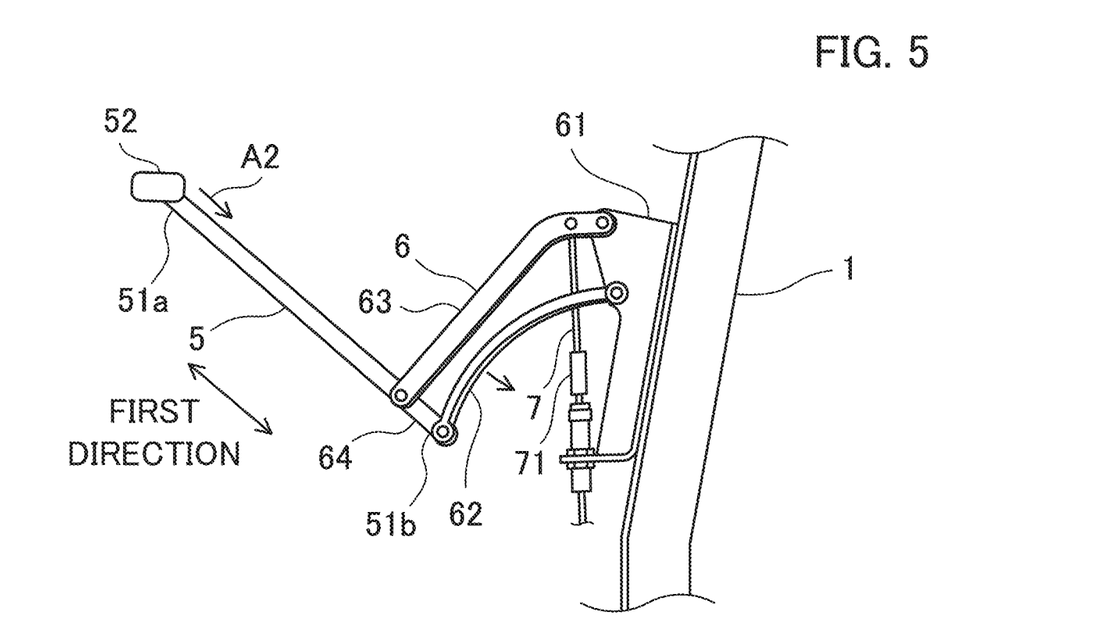
FIG. 5 is a side view of the linkage mechanism while the brake lever is at a working position.

FIG. 4 is a side view illustrating the linkage mechanism 6 in canceling the parking brake 3. FIG. 5 is a side view illustrating the linkage mechanism 6 in allowing the parking brake 3 to work. FIGS. 4 and 5 do not show the dashboard 2. The linkage mechanism 6 is disposed outside the cabin 12 in the vehicle body 1. The brake lever 5 is attached to the vehicle body 1 through the linkage mechanism 6. The linkage mechanism 6 is a four-bar linkage. The linkage mechanism 6 supports the brake lever 5 such that the brake lever 5 is movable substantially linearly. The linkage mechanism 6 includes a first linkage 61, a second linkage 62, a third linkage 63, and a fourth linkage 64.

The first linkage 61 is fixed to the vehicle body 1. The second linkage 62 is rotatably coupled to the first linkage 61. The third linkage 63 is rotatably coupled to the first linkage 61. The fourth linkage 64 is rotatably coupled to the second linkage 62 and the third linkage 63. The fourth linkage 64 is fixedly coupled to the brake lever 5. In this example, the fourth linkage 64 and the brake lever 5 are integrated. Specifically, the fourth linkage 64 is the second end portion 51b.

The brake wire 7 connects the third linkage 63 and the parking brake 3 to each other. In this example, an equalizer 71 is disposed in the vehicle body 1. As illustrated in FIG. 3, the brake wire 7 extends from the third linkage 63 to the equalizer 71, and is branched into two parts through the equalizer 71. The two branches of the brake wire 7 are respectively connected to the parking brakes 3 disposed in the left and right rear wheels 11.

The direction of movement of the brake lever 5 is regulated by the linkage mechanism 6. The brake lever 5 is movable along predetermined first directions. In this example, the first directions substantially coincide with the length direction of the brake lever 5. Specifically, the first directions are substantially orthogonal to the left-right directions, and oblique to the front-rear directions and the top-bottom directions. A direction toward the cabin 12 in the first directions will be referred to as "inward." A direction toward the outside of the cabin 12 in the first directions will be referred to as "outward." In this example, the inward direction is a direction rearward and obliquely upward. An outward direction is a direction forward and obliquely downward. That is, the outward direction includes a downward component.

As illustrated in FIG. 4, when the brake lever 5 is pulled by a driver to a direction indicated by arrow A1, the brake lever 5 moves inward in the first directions. When the brake lever 5 moves inward, each of the second linkage 62 and the third linkage 63 rotates with respect to the first linkage 61 in cooperation with the brake lever 5. Accordingly, the brake wire 7 is pulled by the third linkage 63 so that the parking brake 3 thereby works. The brake lever 5 is pulled to a predetermined position illustrated in FIG. 5 and the brake wire 7 is sufficiently pulled by the third linkage 63 so that the parking brake 3 thereby sufficiently works. The position of the brake lever 5 at which the parking brake 3 sufficiently works is defined as a "working position."

Outward movement of the brake lever 5 at the working position is restricted by, for example, a ratchet mechanism. The ratchet mechanism includes a ratchet and a nail. The nail meshes with the ratchet and is switchable between a state where the nail meshes with the ratchet and a state where the nail is unmeshed from the ratchet. The ratchet is disposed in one of the brake lever 5 and the vehicle body 1, and the nail is disposed in the other of the brake lever 5 and the vehicle body 1. While the brake lever 5 is at the working position, the nail meshes with the ratchet. Accordingly, outward movement of the brake lever 5 is restricted, and the brake lever 5 is kept at the working position. When the nail is unmeshed from the ratchet, the restriction of outward movement of the brake lever 5 is thereby cancelled. The cancellation of meshing between the nail and the ratchet, that is, cancellation of movement restriction of the brake lever 5 by the ratchet mechanism, is performed by operating an operator disposed in the brake lever 5 or the vehicle body 1 and configured to operate in cooperation with the nail or by moving inward the brake lever 5 configured to operate in cooperation with the nail, for example.

When the movement restriction of the brake lever 5 by the ratchet mechanism is cancelled, the brake lever 5 at the working position moves in the direction indicated by arrow A2 in FIG. 5, that is, outward, by the self weight. When the brake lever 5 moves outward, each of the second linkage 62 and the third linkage 63 rotates with respect to the first linkage 61 in cooperation with the brake lever 5. At this time, the third linkage 63 rotates in the direction opposite to the direction when the brake lever 5 is pulled. When the brake lever 5 moves to a predetermined position shown in FIG. 4, the parking brake 3 is thereby cancelled. The position of the brake lever 5 when the parking brake 3 is cancelled will be referred to as a "cancel position."

That is, the brake lever 5 moves along the first directions to thereby move to the working position at which the brake lever 5 allows the parking brake 3 to work and the cancel position at which the brake lever 5 cancels the parking brake 3. The brake lever 5 at the cancel position is located more outward from the cabin 12 than the brake lever 5 at the working position.

Figure 6:
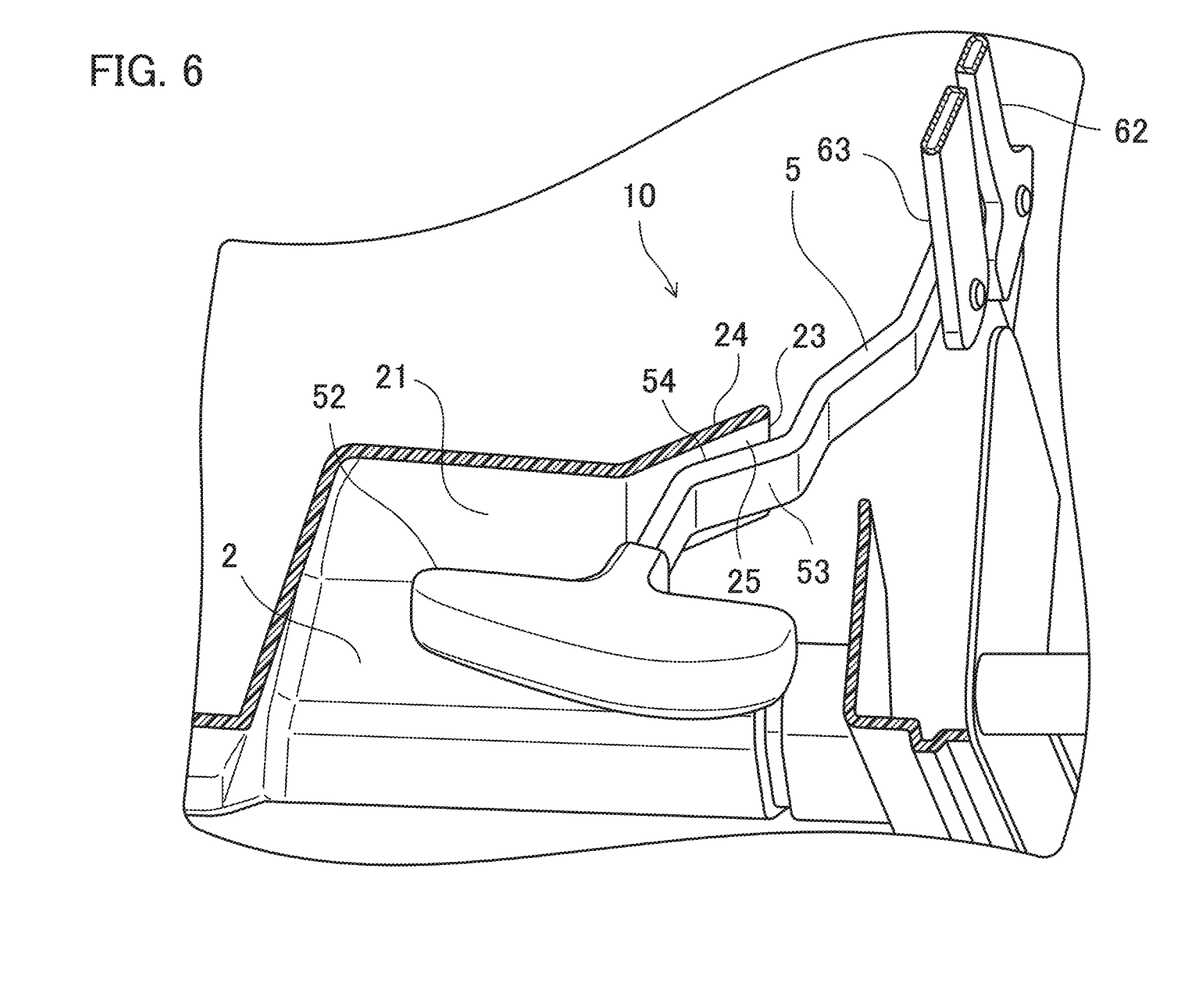
FIG. 6 is a perspective view of the dashboard and the brake lever partially shown in a cross section.

A support structure 10 for the brake lever 5 will now be described. FIG. 6 is a perspective view of the dashboard 2 and the brake lever 5. The support structure 10 includes the brake lever 5 and the dashboard 2.

In this example, the dashboard 2 is made of a resin. The dashboard 2 includes a panel body 21 and a stopper 24 that is to contact the brake lever 5 at the cancel position to thereby restrict movement of the brake lever 5.

The panel body 21 has a hole 23 penetrating the panel body 21 along the thickness thereof. The brake lever 5 penetrates the hole 23.

The stopper 24 is disposed in the panel body 21. In this example, the stopper 24 is integrated with the panel body 21. The stopper 24 is a portion adjacent to the hole 23 in second directions intersecting the first directions. Specifically, the second directions are orthogonal to the first directions. More specifically, the second directions are substantially parallel to the left-right directions. The stopper 24 is a portion of the panel body 21 at the left of the hole 23.

The stopper 24 includes a restriction surface 25 to contact the brake lever 5 at the cancel position. The restriction surface 25 is a surface of the stopper 24 facing inward of the cabin 12. The restriction surface 25 is oblique to both the first directions and the second directions. Specifically, the restriction surface 25 extends outward in the first directions as approaching the hole 23 in the second directions. The orientation of the restriction surface 25 includes an upward component.

Figure 7:
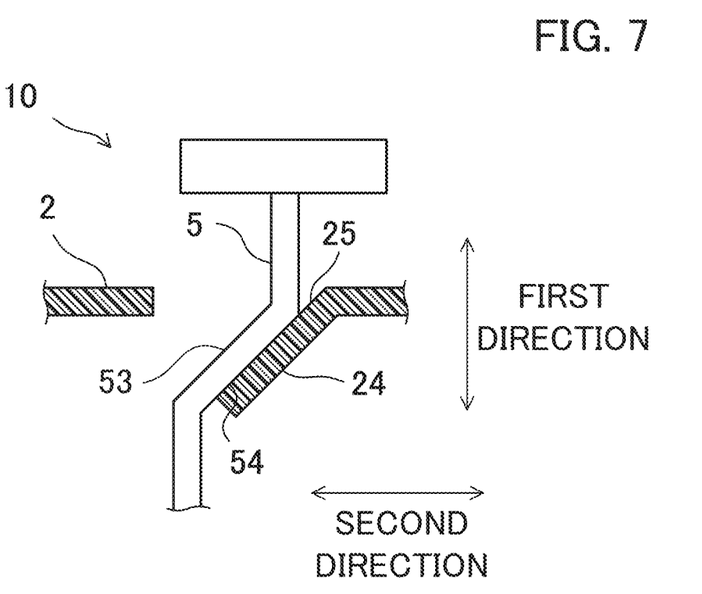
FIG. 7 schematically illustrates the brake lever at the cancel position and the dashboard.
Figure 8:
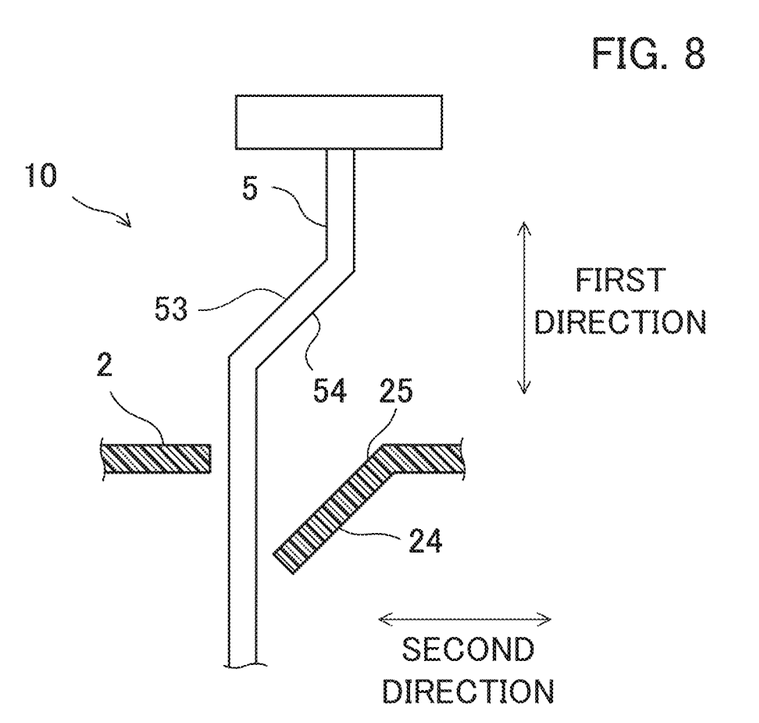
FIG. 8 schematically illustrates the brake lever at the working position and the dashboard.

FIG. 7 schematically illustrates the brake lever 5 at the cancel position and the dashboard 2. FIG. 8 schematically illustrates the brake lever 5 at the working position and the dashboard 2. The brake lever 5 includes a slope surface 54 to contact the restriction surface at the cancel position shown in FIG. 7. In this example, the brake lever 5 includes a slope 53 including the slope surface 54. The slope 53 is located closer to the inside of the cabin 12 than the stopper 24. The slope 53 is oblique to both the first directions and the second directions in conformity with the restriction surface 25. A surface of the slope 53 facing the outside of the cabin 12 is the slope surface 54. The slope surface 54 is oblique to both the first directions and the second directions. The slope surface 54 is substantially parallel to the restriction surface 25.

When the brake lever 5 is at the working position, the slope surface 54 is separated from the restriction surface 25 toward the inside of the cabin 12. The brake lever 5 does not contact the edge of the hole 23 of the dashboard 2. That is, the brake lever 5 does not contact the dashboard 2.

While the brake lever 5 moves between the working position and the cancel position except for the cancel position, the slope surface 54 is also separated from the restriction surface 25. That is, when the brake lever 5 is located between the working position and the cancel position except for the cancel position and the cancel position, the brake lever 5 is not in contact with the stopper 24. That is, the brake lever 5 at a position except for the cancel position does not contact the stopper 24.

When the brake lever 5 arrives at the cancel position from the working position, the slope surface 54 is brought into contact with the restriction surface 25 as illustrated in FIGS. 6 and 7. Specifically, the slope surface 54 is brought into surface contact with the restriction surface 25. At this time, the slope surface 54 is pressed against the restriction surface 25 by the self weight of the brake lever 5. This contact of the slope surface 54 with the restriction surface 25 causes the stopper 24 to restrict movement of the brake lever 5 in the first directions and movement of the brake lever 5 in the second directions.

The brake lever 5 during traveling of the utility vehicle 100 is usually at the cancel position at which the parking brake 3 is cancelled. Accordingly, the brake lever 5 might vibrate greatly because of vibrations of the vehicle body 1 during traveling. When the brake lever 5 vibrates greatly, the brake lever 5 might contact a peripheral object to cause strange noise. In addition, the linkage mechanism 6 supporting the brake lever 5 might vibrate to cause strange noise. However, movement of the brake lever 5 at the cancel position is restricted by the stopper 24. Thus, vibrations of the brake lever 5 during traveling of the utility vehicle 100 can be reduced, and further, vibrations of the linkage mechanism 6 can also be reduced. Since vibrations of the brake lever 5 can be reduced by utilizing the dashboard 2 through which the brake lever 5 penetrates, no additional members are needed for reducing vibrations of the brake lever 5. Consequently, the support structure 10 can be simplified.

While the brake lever 5 is at the working position, the stopper 24 is not in contact with the brake lever 5 and does not restrict movement of the brake lever 5. While the parking brake 3 works, the utility vehicle 100 is stationary, and the vehicle body 1 does not vibrate greatly, unlike the state during traveling. Thus, even if movement of the brake lever 5 at the working position is not restricted by the stopper 24, the brake lever 5 does not vibrate. Accordingly, no configuration is needed for restricting movement of the brake lever 5 at the working position, and thus, the support structure 10 can be simplified.

In addition, even while the brake lever 5 moves between the working position and the cancel position except for the cancel position, the stopper 24 does not contact the brake lever 5, and does not restrict movement of the brake lever 5. Accordingly, the brake lever 5 smoothly moves between the working position and the cancel position except for the cancel position. As a result, operability of the brake lever 5 can be assured.

The stopper 24 restricts movement of the brake lever 5 in the second directions. The second directions are directions substantially intersecting the length directions of the brake lever 5. The brake lever 5 is more likely to vibrate in the directions intersecting the length directions of the brake lever 5 than the length directions of the brake lever 5. Thus, vibrations of the brake lever 5 can be effectively reduced by restricting movement of the brake lever 5 in the second directions by the stopper 24.

The restriction of movement of the brake lever 5 in the second directions by the stopper 24 is also effective while the utility vehicle 100 is stationary. For example, if the brake lever 5 rattles in the second directions when a hand of a passenger unintentionally touches the brake lever 5 at the cancel position, the passenger feels uneasy, which lowers product values. If the brake lever 5 rattles in the second directions when a driver is pulling the brake lever 5 at the cancel position, the driver might feel uneasy and discomfort. On the other hand, in the support structure 10 disclosed here, the stopper 24 can reduce rattles of the brake lever 5 in the second directions, and thus, a passenger is not likely to feel uneasy and discomfort, which enhances product values.

In addition, the stopper 24 restricts movement of the brake lever 5 in the first directions. Thus, the brake lever 5 at the cancel position can be positioned in the first directions by the stopper 24. Since the stopper 24 restricts movement of the brake lever 5 in both the first directions and the second directions, vibrations of the brake lever 5 can be further reduced.

In this example, the brake lever 5 is pressed against the restriction surface 25 of the stopper 24 by the self weight. Accordingly, vibrations of the brake lever 5 can be further reduced by the stopper 24.

Furthermore, movement of the brake lever 1 in which the brake lever 1 moves along the first directions to contact the stopper 24 is restricted by the restriction surface 25 oblique to both the first directions and the second directions. Accordingly, movement of the brake lever 5 in both the first directions and the second directions can be restricted by a simple structure. As a result, the shape of the stopper 24 is simplified, and accordingly, the shape of the dashboard is simplified.

The slope surface 54 is oblique to both the first directions and the second directions in conformity with the restriction surface 25. The slope surface 54 is in surface contact with the restriction surface 25 while the brake lever 5 is at the cancel position. Thus, as compared to a case where the stopper 24 is in line contact or in point contact with the restriction surface 25, a friction force between the brake lever 5 and the restriction surface 25 is large. As a result, vibrations of the brake lever 5 in the first directions and the second directions can be appropriately reduced.

Since the stopper 24 is integrated with the panel body 21, the dashboard 2 including the stopper 24 can be easily fabricated by using a resin, for example. Since the stopper 24 is made of a resin, occurrent of strange noise when the stopper 24 contacts the metal brake lever can be reduced.

As described above, the support structure 10 for the brake lever 5 includes: the brake lever 5 movable between the working position at which the parking brake 3 of the utility vehicle 100 (off-road vehicle) works and the cancel position at which the parking brake 3 is cancelled; and the dashboard 2 (interior panel) defining the internal surface of the cabin 12 of the utility vehicle 100. The brake lever 5 extends from inside of the cabin 12 to outside of the cabin 12 through the dashboard 2. The dashboard 2 includes the stopper 24 that contacts the brake lever at the cancel position to restrict movement of the brake lever 5.

The utility vehicle 100 includes: the vehicle body 1 including the cabin 12; the wheel 11 disposed to the vehicle body 1; the parking brake 3 that applies a braking force to the wheel 11, and the support structure 10 for the brake lever 5.

With this configuration, the stopper 24 restricts movement of the brake lever 5 at the cancel position. Thus, even when the vehicle body 1 vibrates during traveling of the utility vehicle 100, the brake lever 5 does not easily vibrate. Accordingly, vibrations of the brake lever 5 and occurrence of strange noise caused by the vibrations can be reduced, and uneasiness of the passenger can be reduced. In addition, since vibrations of the brake lever 5 are reduced by utilizing the dashboard 2 through which the brake lever 5 penetrates, the support structure can be simplified.

The stopper 24 does not contact the brake lever 5 at the working position.

This configuration can simplify the support structure 10 for the brake lever 5. That is, while the brake lever 5 is at the working position, the utility vehicle 100 is stopped, and the brake lever 5 does not vibrate. Thus, no configuration is needed for reducing vibrations of the brake lever 5 at the working position, and thus, the support structure 10 can be simplified.

The stopper 24 does not contact the brake lever 5 at a position except for the cancel position.

With this configuration, while the brake lever 5 moves between the working position and the cancel position except for the cancel position, the stopper 24 is not in contact with the brake lever 5, and does not restrict movement of the brake lever 5. Accordingly, the brake lever 5 smoothly moves between the working position and the cancel position except for the cancel position. As a result, operability of the brake lever 5 can be assured.

The brake lever 5 moves between the working position and the cancel position along the predetermined first direction, and the stopper 24 restricts movement of the brake lever 5 in the second direction that is a direction intersecting the predetermined first direction.

This configuration can reduce vibrations of the brake lever 5 in the second directions.

The first direction substantially coincides with the length direction of the brake lever 5.

With this configuration, the stopper 24 can reduce vibrations of the brake lever 5 in directions intersecting the length directions of the brake lever 5. The brake lever 5 is more likely to vibrate in the directions intersecting the length directions of the brake lever 5 than the length directions of the brake lever 5. Thus, vibrations of the brake lever 5 can be effectively reduced by restricting movement of the brake lever 5 in the second directions by the stopper 24.

The stopper 24 restricts movement of the brake lever 5 in both the first direction and the second direction.

With this configuration, the brake lever 5 at the cancel position can be positioned in the first directions by the stopper 24. Since the stopper 24 restricts movement of the brake lever 5 in both the first directions and the second directions, vibrations of the brake lever 5 can be further reduced.

The stopper 24 includes the restriction surface 25 oblique to both the first direction and the second direction. The restriction surface 25 is brought into contact with the brake lever 5 at the cancel position to thereby restrict movement of the brake lever 5 in both the first direction and the second direction.

With this configuration, movement of the brake lever 5 in both the first directions and the second directions can be restricted by a simple structure. As a result, the shape of the stopper 24 is simplified, and accordingly, the shape of the dashboard is simplified.

The brake lever 5 includes the slope surface 54 oblique to both the first direction and the second direction in conformity with the restriction surface 25. The restriction surface 25 is brought into contact with the slope surface 54 of the brake lever 5 at the cancel position to thereby restrict movement of the brake lever 5 in both the first direction and the second direction.

With this configuration, a friction force between the slope surface 54 and the restriction surface 25 occurring when the slope surface 54 contacts the restriction surface 25 can be increased. Thus, vibrations of the brake lever 5 in the first directions and the second directions can be appropriately reduced.

The dashboard 2 includes the panel body 21. The stopper 24 is integrated with the panel body 21.

With this configuration, the dashboard 2 including the stopper 24 can be easily fabricated by using, for example, a resin.

OTHER EMBODIMENTS

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the embodiment described above may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

Figure 9:
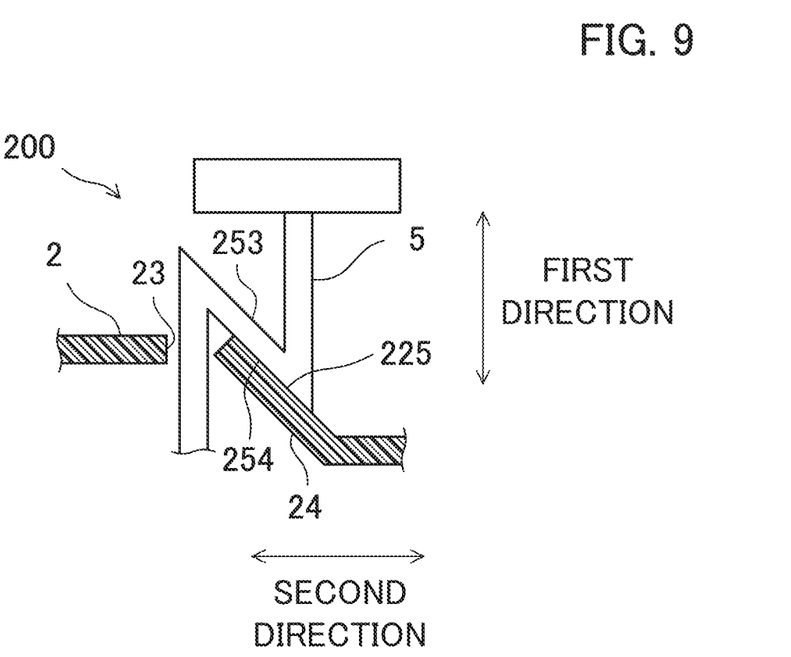
FIG. 9 schematically illustrates a support structure for a brake lever according to a first variation.

FIG. 9 is a cross-sectional view schematically illustrating a support structure 200 for the brake lever 5 according to a first variation. The support structure 200 in this example is different from the support structure 10 in that a restriction surface 225 of the stopper 24 is located inward of the cabin 12 as the distance to the hole 23 of the dashboard 2 decreases. A basic configuration of the support structure 200 is the same as that of the support structure 10. Thus, parts of the support structure 200 different from the support structure 10 will be mainly described.

Each of a slope 253 and a slope surface 254 of the brake lever 5 is oblique to the first directions and the second directions in conformity with the restriction surface 225. While the brake lever 5 is at the cancel position, the slope surface 254 is in contact with the restriction surface 225, as illustrated in FIG. 9. Accordingly, movement of the brake lever 5 in the first directions and the second directions is restricted.

Figure 10:
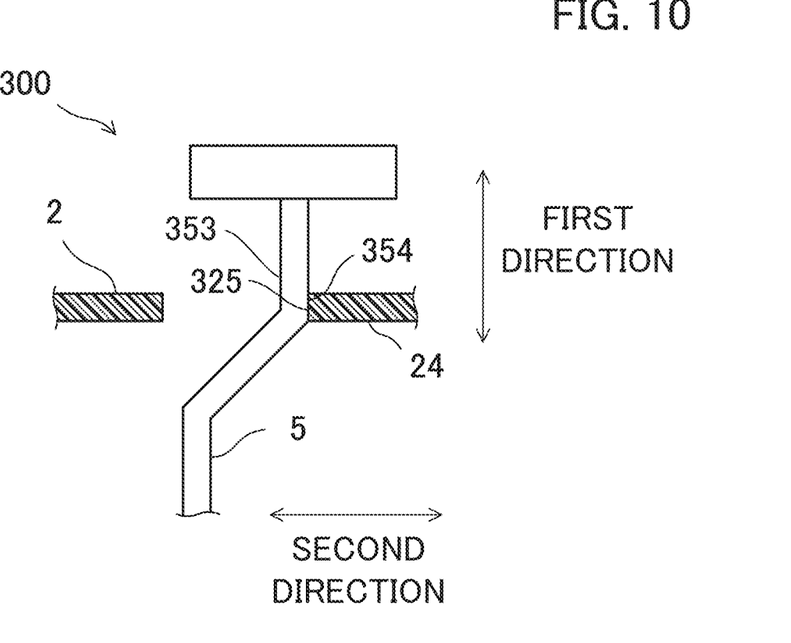
FIG. 10 schematically illustrates a support structure for a brake lever according to a second variation.

FIG. 10 schematically illustrates a support structure 300 for the brake lever 5 according to a second variation. The support structure 300 in this example is different from the support structure 10 in that the stopper 24 restricts movement of the brake lever 5 only in the second directions in the first directions and the second directions. A basic configuration of the support structure 300 is the same as that of the support structure 10. Thus, parts of the support structure 300 different from the support structure 10 will be mainly described.

A restriction surface 325 of the stopper 24 extends along the first directions. The brake lever 5 includes a contact surface 354 that contacts the restriction surface 325 at the cancel position. In this example, the brake lever 5 includes a contact 353 including the contact surface 354. The contact 353 extends along the first directions. One of the surfaces of the contact 353 facing in the second directions is the contact surface 354. The contact surface 354 extends along the first directions. While the brake lever 5 is at the cancel position, the contact surface 354 is in contact with the restriction surface 325, as illustrated in FIG. 10. Accordingly, movement of the brake lever 5 in the second directions is restricted.

Figure 11:
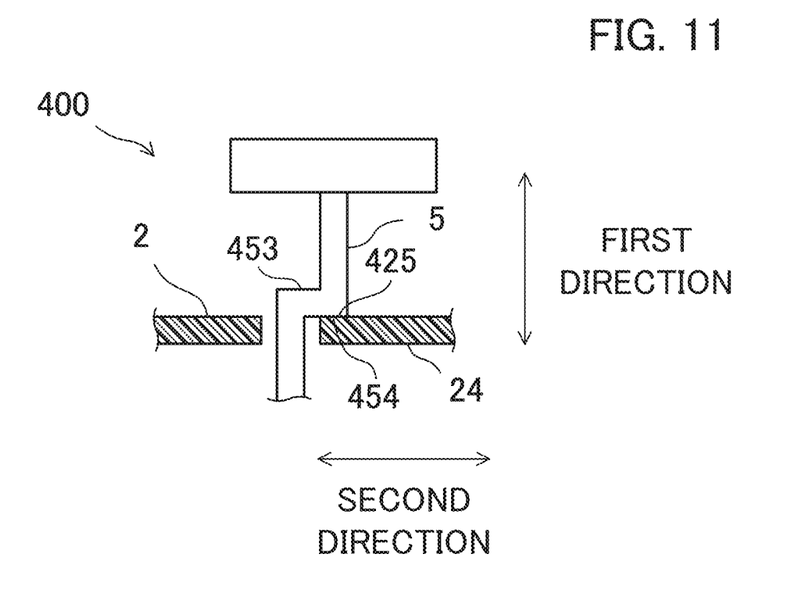
FIG. 11 schematically illustrates a support structure for a brake lever according to a third variation.

FIG. 11 schematically illustrates a support structure 400 for the brake lever 5 according to a third variation. The support structure 400 in this example is different from the support structure 10 in that the stopper 24 restricts movement of the brake lever 5 only in the first directions in the first directions and the second directions. A basic configuration of the support structure 400 is the same as that of the support structure 10. Thus, parts of the support structure 400 different from the support structure 10 will be mainly described.

A restriction surface 425 of the stopper 24 is substantially orthogonal to the first directions. The brake lever 5 includes a contact surface 454 that is in contact with the restriction surface 425 at the cancel position. In this example, the brake lever 5 includes the contact 453 including the contact surface 454. The contact 453 extends along the second directions. A surface of the contact 453 facing outward of the cabin 12 is the contact surface 454. The contact surface 454 is substantially parallel to the second directions.

While the brake lever 5 is at the cancel position, the contact surface 454 is in contact with the restriction surface 425, as illustrated in FIG. 11. Accordingly, movement of the brake lever 5 in the first directions is restricted.

Figure 12:
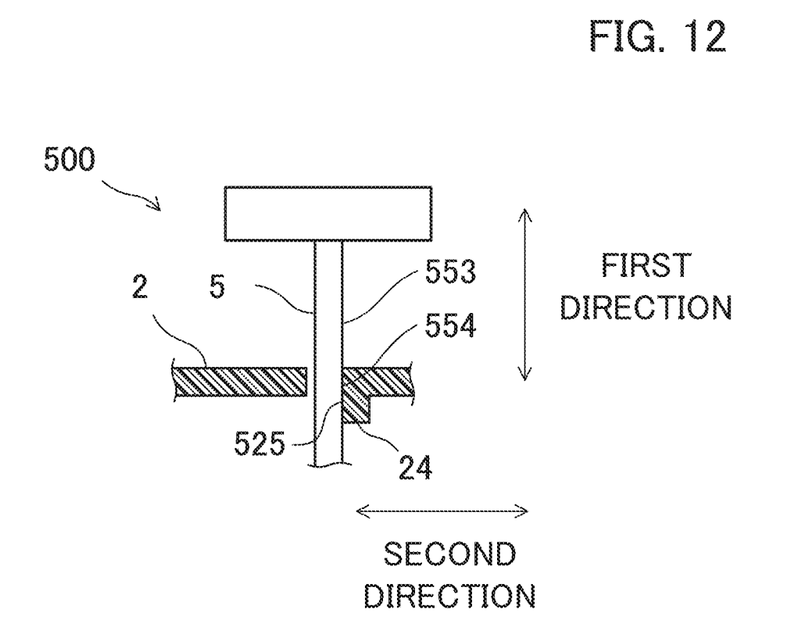
FIG. 12 schematically illustrates a support structure for a brake lever according to a fourth variation.

FIG. 12 is a cross-sectional view schematically illustrating a support structure 500 for the brake lever 5 according to a fourth variation. The support structure 500 in this example is different from the support structure 10 in that the stopper 24 restricts movement of the brake lever 5 only in the second directions in the first directions and the second directions. A basic configuration of the support structure 500 is the same as that of the support structure 10. Thus, parts of the support structure 500 different from the support structure 10 will be mainly described.

A restriction surface 525 of the stopper 24 extends along the first directions. The brake lever 5 includes a contact surface 554 that is in contact with the restriction surface 525 at the cancel position. In this example, the brake lever 5 includes the contact 553 including the contact surface 554. The contact 553 extends along the first directions. One of the surfaces of the contact 553 facing in the second directions is the contact surface 554. The contact surface 554 extends along the first directions.

While the brake lever 5 is at the cancel position, the contact surface 554 is in contact with the restriction surface 525, as illustrated in FIG. 12. In this example, the contact surface 554 is also in contact with the restriction surface 525 while the brake lever 5 is at a position except for the cancel position. Thus, vibrations of the brake lever 5 can be reduced not only while the brake lever 5 is at the cancel position but also while the brake lever 5 is at a position except for the cancel position.

The off-road vehicle and the configuration of the off-road vehicle can be changed as appropriate. For example, the off-road vehicle may be an all terrain vehicle (ATV), a tractor, or other vehicles. The vehicle is not limited to a four-wheeled vehicle, and may be a two-wheeled vehicle, for example.

The parking brake 3 may apply a braking force to the left and right front wheels 11 and the left and right rear wheels 11 or may apply a braking force only to the left and right front wheels.

The dashboard 2 may be made of a material other than a resin. The dashboard 2 may be made of a metal, for example. The stopper 24 may be a member different from the panel body 21.

The interior panel is not limited to the dashboard 2. The interior panel may be a floor panel defining the bottom surface of the cabin 12.

A position at which the brake lever 5 is located on the dashboard 2 is not limited. For example, the brake lever 5 may be located leftward of the steering wheel 15 on the dashboard 2.

The brake lever 5 may be made of a material other than a metal. The direction in which the brake lever 5 moves between the working position and the cancel position may be different from the length directions of the brake lever 5. The brake lever 5 is not limited to a member that linearly moves between the working position and the cancel position. The brake lever 5 may be a member that rotates about a predetermined rotation axis, for example. The second directions along which the stopper 24 restricts movement of the brake lever are not limited to the left-right directions. The second directions may be the top-bottom directions, for example. The length directions of the brake lever 5 are not limited. For example, the length directions of the brake lever 5 may be parallel to the front-rear directions, the top-bottom directions, or the left-right directions. The direction in which the brake lever 5 moves from the working position toward the cancel position only needs to include a downward component, and may be oblique to the downward direction as described in the embodiment described above, or may be parallel to the downward direction. The direction in which the brake lever 5 moves from the working position toward the cancel position may not include a downward component.

In a case where a large friction force is generated in a coupling portion between the brake lever 5 and the linkage mechanism 6 or the linkage mechanism 6 while the brake lever 5 moves along the first directions, the brake lever 5 does not move along the first directions unless a certain magnitude of a force is applied to the brake lever 5. In this case, the ratchet mechanism may be omitted.

The invention claimed is:

1. A brake lever support structure comprising:
   a brake lever movable between a working position at which a parking brake of an off-road vehicle works and a cancel position at which the parking brake is cancelled;
   an interior panel defining an inner surface of a cabin of the off-road vehicle; and
   a grip disposed at an end portion of the brake lever in a length direction of the brake lever, the end portion being located inside the cabin, wherein
   the brake lever extends from inside of the cabin to outside of the cabin through the interior panel,
   the interior panel includes a panel body and a stopper that is disposed at the panel body and contacts the brake lever at the cancel position to restrict movement of the brake lever, and
   the grip does not contact the stopper when the brake lever is at the cancel position.

2. The brake lever support structure according to claim 1, wherein
   the stopper does not contact the brake lever at the working position.

3. The brake lever support structure according to claim 1, wherein
the stopper does not contact the brake lever at a position except for the cancel position.

4. The brake lever support structure according to claim 1, wherein
the brake lever moves between the working position and the cancel position along a predetermined first direction, and
the stopper restricts movement of the brake lever in a second direction that is a direction intersecting the first direction.

5. The brake lever support structure according to claim 4, wherein
the first direction substantially coincides with the length direction of the brake lever.

6. The brake lever support structure according to claim 5, wherein
the stopper restricts movement of the brake lever in both the first direction and the second direction.

7. A brake lever support structure comprising:
a brake lever movable between a working position at which a parking brake of an off-road vehicle works and a cancel position at which the parking brake is cancelled; and
an interior panel defining an inner surface of a cabin of the off-road vehicle, wherein
the brake lever extends from inside of the cabin to outside of the cabin through the interior panel and moves between the working position and the cancel position along a predetermined first direction,
the interior panel includes a stopper that contacts the brake lever at the cancel position to restrict movement of the brake lever,
the stopper includes a restriction surface oblique to both the first direction and a second direction that is a direction intersecting the first direction, and
the restriction surface is brought into contact with the brake lever at the cancel position to thereby restrict movement of the brake lever in both the first direction and the second direction.

8. The brake lever support structure according to claim 7, wherein
the brake lever includes a slope surface oblique to both the first direction and the second direction in conformity with the restriction surface, and
the restriction surface is brought into contact with the slope surface of the brake lever at the cancel position to thereby restrict movement of the brake lever in both the first direction and the second direction.

9. The brake lever support structure according to claim 7, wherein
the brake lever includes a slope surface oblique to both the first direction and the second direction in conformity with the restriction surface.

10. The brake lever support structure according to claim 7, wherein
the stopper does not contact the brake lever at the working position.

11. The brake lever support structure according to claim 7, wherein
the stopper does not contact the brake lever at a position except for the cancel position.

12. A brake lever support structure comprising:
a brake lever movable between a working position at which a parking brake of an off-road vehicle works and a cancel position at which the parking brake is cancelled; and
an interior panel defining an inner surface of a cabin of the off-road vehicle, wherein
the brake lever extends from inside of the cabin to outside of the cabin through the interior panel,
the interior panel includes a stopper that contacts the brake lever at the cancel position to restrict movement of the brake lever,
the interior panel includes a panel body, and
the stopper is integrated with the panel body.

13. The brake lever support structure according to claim 12, wherein
the stopper does not contact the brake lever at the working position.

14. The brake lever support structure according to claim 12, wherein
the stopper does not contact the brake lever at a position except for the cancel position.

15. An off-road vehicle comprising:
a vehicle body including the cabin;
a wheel disposed to the vehicle body;
a parking brake that applies a braking force to the wheel; and
the brake lever support structure according to claim 1.

* * * * *